No. 853,877. PATENTED MAY 14, 1907.
O. F. HARVEY.
BATTERY ELEMENT.
APPLICATION FILED AUG. 11, 1905.
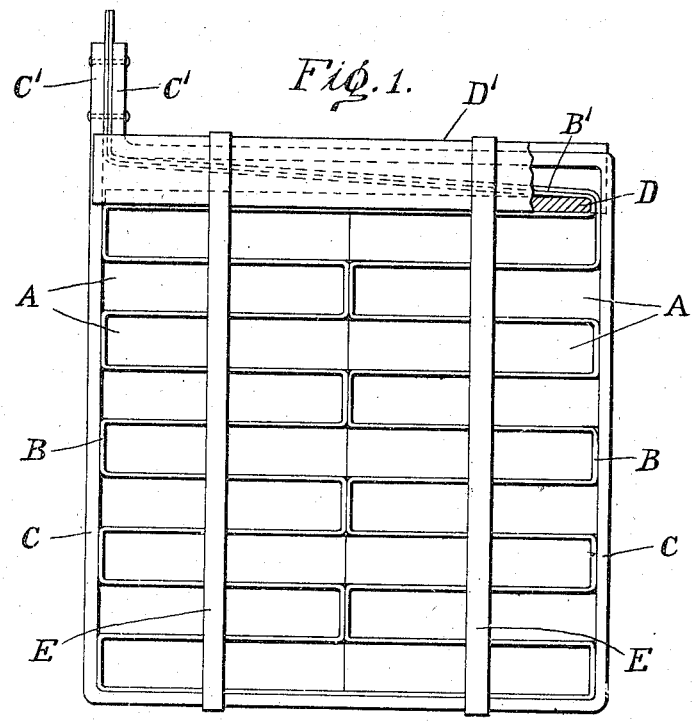
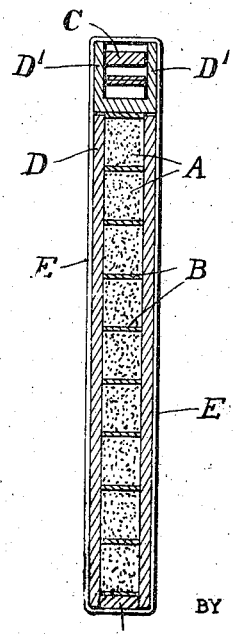
WITNESSES
D. Webster, Jr.
J. J. Williamson
INVENTOR
Olin F. Harvey
BY
W. Preston Williamson
ATTY.

UNITED STATES PATENT OFFICE.

OLIN F. HARVEY, OF WILKES-BARRE, PENNSYLVANIA.

BATTERY ELEMENT.

No. 853,877.  Specification of Letters Patent.  Patented May 14, 1907.

Application filed August 11, 1905. Serial No. 273,841.

*To all whom it may concern:*

Be it known that I, OLIN F. HARVEY, a citizen of the United States, residing at Wilkes-Barre, county of Luzerne, and State of Pennsylvania, have invented a certain new and useful Improvement in Battery Element, of which the following is a specification.

My invention relates to a new and useful improvement in battery element, and has for its object to provide a battery element whereby the expansion and contraction of the active material is provided for within the plate, and the plate being so constructed that the conductor is always held in contact with the active material whether the same is expanding or contracting, and the plate is so made that the containing frame will not be forced out of line by the expansion of the active material.

With these ends in view, this invention consists in the details of construction and combination of elements hereinafter set forth and then specifically designated by the claims.

In order that those skilled in the art to which this invention appertains may understand how to make and use the same, the construction and operation will now be described in detail, reference being had to the accompanying drawing forming a part of this specification, in which—

Figure 1 is a side elevation of one of my improved battery elements; Fig. 2, a vertical cross-section through the same;

My improved battery element relates to that class of plates known as the elastic plates—that is, the expansion and contraction of the active material is provided for within the plate, the conductor being flexible and provided with means for causing said conductor to follow the expansion and contraction of the active material.

A represents the blocks of active material; B is the conductor consisting of a strip of lead or other suitable conducting material, which passes around and is in contact with at least three sides of each block of active material. The blocks A of active material may be molded independently and placed in between the conducting strip, or the active material may be pasted in the plate after the conductor has been formed into shape.

C is a frame surrounding the plate upon all four sides thereof. This frame may be made of any suitable material which is stiff enough to hold the plate in shape and may be either conducting or non-conducting material, the preferable material used is hard rubber. The top of the blocks of the active material is level, and when the plate is first made, and before it is formed, the top of the blocks of active material do not extend to the top of the frames C, there being considerable distance left between the active material and the frame.

It is a well-known fact that in a positive pole element, when the active material is formed—that is, when the newly pasted plate is first subjected to the electric current so as to form it into peroxid of lead, the active material expands to a considerable extent, and therefore if the frame C hugged the active material tightly when the plate was first made, then when the active material expanded the frame would be broken, therefore while it is absolutely necessary that the conducting strip shall be held in tight contact with the active material, still there must be sufficient room left between some part of the frame and the active material to allow said active material to expand in order to make a practical and elastic plate, and even after the plate is formed the charge and discharge of the plate contracts and expands the active material to a certain extent, although not to as great a degree as on the forming charge, therefore an elastic means must be provided which will cause the conductor to follow the active material in its expansion and contraction, and at the same time prevent any strain put upon the containing frame of the plate. In order to accomplish this I provide a plate D of any suitable stiff material, preferably of hard rubber, which rests upon the top of the blocks of active material in between the top of the frame and said blocks. This plate D is provided upon each side with the vertical flanges D' extending upward therefrom, and a sufficient distance apart so as to pass upon each side of the top of the frame C, and are of such a length that when the plate is newly made the top of the flanges D' will be a slight distance above the top of the frame C, and the plate D will be a considerable distance from the underside of the top of the frame C. The flanges D' extend outward a slight distance at each end so as to embrace the sides of the frame C and furnish an additional guide for the plate D in its vertical movement.

E are elastic bands of rubber or other suitable material which surround the plate vertically, and therefore bear downward upon the upper edges of the flanges D', and so hold the plate D in tight contact with the upper edge of the blocks A. This pressure downward upon the blocks will serve to hold the conductor B in tight contact with the active material, whether the active material is expanding or contracting, and it will be seen that the blocks of active material can expand collectively in volume sufficient to take up the space between the plate D and the top of the frame C without exerting any undue pressure upon said frame, and when the plate contracts under subsequent charges and expands under subsequent discharges the elastic means will cause the plate D to follow the active material in its expansion and contraction and keep the conductors always in tight contact with the active material. Of course other elastic means could be employed for forcing the plate D downward, such as for instance, interposing springs of hard rubber or the like, or blocks of soft rubber or the like in between the plate D and the top of the frame C, but I have found by experience that the encircling rubber bands are the most practical.

In order to guard against the breaking of the conductor during the expansion of the plate while undergoing the forming charge, the conducting strip B after passing around the blocks A passes upward above the plate D by passing in between one end of the plate D and the side of the frame C, and then extends diagonally across to the opposite side of the block, when it passes upward between the two up-turned ends C' of the frame, and thus forms the lug, the two up-turned ends C' of the frame being preferably riveted together with the conducting strip in between the same. This long strip B' of the conductor B which extends above the plate D is not materially affected by the rise and fall of the plate D, and therefore no strain is exerted upon the conductor, such as would occur if the conducting strip extended directly to the lug from the blocks A. Of course other means could be employed for relieving the conducting strip of the strain during the expansion of the plate, as for instance, by corrugating or forming loose bends in the conductor between the blocks and the lug, but I have found by practice that the form shown is the most practical, and therefore is the form I generally use.

Of course I do not wish to be limited to the exact construction here shown, as slight modifications could be made without departing from the spirit of the invention.

Having thus fully described my invention, what I claim as new and useful, is—

1. In a battery element, a series of blocks of active material arranged one above the other, a flexible conducting strip in contact with each of said blocks, said conducting strip terminating in a lug extending from the upper end of the plate, a supporting frame surrounding the blocks of active material and conductor, a plate resting upon the top of the blocks of active material and primarily spaced a distance below the top of the frame, means for guiding said plate upon the frame as it moves vertically during the expansion and contraction of the active material, and elastic means tending to hold the plate in close contact with the top of the active material.

2. In a battery element, a flexible conducting strip bent so as to form spaces, active material disposed within said spaces, the top of the active material being horizontal, a containing frame surrounding the edges of the active material, a space being left between the top of the active material and the top of the frame, a plate resting upon the top of the active material, elastic means tending to force the plate downward upon the active material, means for guiding said plate upon the frame, the end of the conducting strip terminating in a lug, the conducting strip so arranged in between the active material and the lug as to relieve said conducting strip of any strain as the active material expands and contracts.

3. In a battery element, a plurality of rectilinear blocks of active material arranged in tiers one above the other, a strip of conducting material passing in and out between the blocks so that each of the blocks is in contact with the conductor upon one or more of its sides, a containing frame surrounding the element, a space being left primarily between the active material and the top of the frame, the end of the conducting strip terminating in a lug at one corner of the frame, the ends of said frame extending upward upon each side of the lug with the lug secured in between the same, a flat plate resting upon the top of the active material, flanges secured to the plate upon each side and extending upward upon each side of the top of the frame and a slight distance above the same, elastic bands surrounding the element vertically so as to bear downward upon the upper edges of the flanges, said flanges extending outward from each end of the movable plate so as to embrace the sides of the frame.

4. In a battery element, a plurality of rectilinear blocks of active material arranged in tiers one above the other, a strip of conducting material passing in and out between the blocks so that each of the blocks is in contact with the conductor upon one or more of its sides, a containing frame surrounding the element, a space being left primarily between the active material and the top of the frame, the end of the conducting strip terminating in a lug at one corner of the frame, the ends of said frame extending upward upon each side of the lug with the lug secured in between the same, a flat plate resting upon the top of the active material, flanges secured to the plate upon each side and extending upward upon each side of the top of the frame and a slight distance above the same, elastic bands surrounding the element vertically so as to bear downward upon the upper edges of the flanges, said flanges extending outward from each end of the movable plate so as to embrace the sides of the frame, the conducting strip adapted to pass upward around that end of the movable plate upon the opposite side from that of the lug and then extend diagonally across to the lug above the movable plate, as and for the purpose specified.

In testimony whereof, I have hereunto affixed my signature in the presence of two subscribing witnesses.

OLIN F. HARVEY.

Witnesses:
S. L. FEDDER,
EDWARD GUNSTER.